United States Patent [19]

Hagene et al.

[11] Patent Number: 6,112,415
[45] Date of Patent: Sep. 5, 2000

[54] HOOKBILL WIRE CUTTER

[75] Inventors: Steve Hagene; Terry McCrary, both of Pinckneyville; Donald Ohms, Sparta, all of Ill.

[73] Assignee: GS Metals Corp., Pinckneyville, Ill.

[21] Appl. No.: 09/232,173

[22] Filed: Jan. 15, 1999

[51] Int. Cl.$^7$ ..................................................... B26B 13/06
[52] U.S. Cl. .................................. 30/254; 30/251; 30/252
[58] Field of Search ............................. 30/194, 203, 204, 30/228, 244, 254, 251, 252

[56] References Cited

U.S. PATENT DOCUMENTS

| | | | |
|---|---|---|---|
| 644,350 | 2/1900 | Decelle | 30/252 |
| 938,627 | 11/1909 | Arneson | 30/251 |
| 1,425,779 | 8/1922 | Killin | 30/252 |
| 2,794,250 | 6/1957 | Bethune | 30/254 |
| 2,870,538 | 1/1959 | Townshend, Jr. | 30/254 |
| 3,461,555 | 8/1969 | Bliznak | 30/254 |
| 4,229,881 | 10/1980 | Troxel | 30/254 |
| 4,549,349 | 10/1985 | Harrison | 30/254 |
| 5,638,602 | 6/1997 | Wilhelm | 30/254 |
| 5,749,147 | 5/1998 | Hasegawa | 30/254 |
| 5,950,314 | 9/1999 | Chang | 30/254 |

*Primary Examiner*—Hwei-Siu Payer
*Attorney, Agent, or Firm*—Piper Marbury Rudnick & Wolfe

[57] ABSTRACT

A hookbill wire cutter specially designed to cut wire mesh components features a pair of opposing handles connected to a pair of jaws. Each jaw features an arcuate blade having a flat cutting portion and a tapered portion. The jaws are pivotally joined to open and close when the handles are actuated so that the blade cutting portions overlap in a scissor-like fashion. One of the arcuate blades features a notched tip that engages a wire member perpendicular to the wire member being cut. As a result, the wire cutter may be quickly and easily positioned. The arcuate blades are dimensioned to substantially surround a wire member so that the wire member is sheared flush when the jaws of the wire cutter are closed. As a result, generally smooth and flat cut wire ends are produced.

10 Claims, 5 Drawing Sheets

HOOKBILL WIRE CUTTER

BACKGROUND OF THE INVENTION

The invention relates generally to wire cutting tools, and, more particularly, to a hookbill wire cutter specially designed to cut wire mesh components such as cable support trays.

Computer, telecommunication and other electronic-based systems are utilized extensively in modern manufacturing plants, hospitals, schools, homes, telecommunication centers and other commercial and noncommercial environments. Such complex systems typically feature a large number of cables that must be routed throughout a structure. As a result, cable management systems that organize and protect cables have become popular. One type of cable management system utilizes trays to support cables.

A prior art cable support tray system, the FLEXTRAY system offered by the present assignee, is indicated generally at 20 in FIG. 1. The system of FIG. 1 utilizes a number of standard tray sections, such as the one indicated generally at 22 in FIG. 2, that feature welded wire mesh construction and that may be cut, bent and joined to form a variety of tray configurations, such as those illustrated at 24 and 26 in FIG. 1. As a result, as illustrated in FIG. 1, tray sections may be configured to form paths that turn, rise, drop and intersect. This allows the tray system 20 to support and direct a number of cables 28 around, over or under obstacles.

As shown in FIG. 2, each tray section is formed of longitudinal wire members 30 welded to transverse wire members 32. The longitudinal and transverse wire members are constructed of a bendable material such as steel and typically feature a diameter of at least approximately ⅛". Portions of the longitudinal and transverse wire members are removed by wire cutters so that the tray sections may be bent or configured to form sections such as those illustrated in FIG. 1. For example, referring to FIG. 2, a wire cutter is utilized to cut longitudinal wire member 30 at locations 34 and 36 to remove portion 40. As a result, a cable drop, as illustrated at 42 in FIG. 1, is created in tray section 22.

While traditional wire cutters may be used to cut the wire members of tray section 22, such an approach suffers from a number of disadvantages. More specifically, the use of traditional wire cutters result, in "cinch points" on the ends of the cut wires. When a straight blade wire cutter is used, the cinch point appears as indicated at 52 on cut wire member 54 in FIG. 3. When an offset blade wire cutter is used, the cinch point appears as indicated at 56 on cut wire member 58 in FIG. 4. Cinch points such as those illustrated in FIGS. 3 and 4 are undesirable in that they form sharp protrusions which could potentially cut the cables being supported by the tray segment. Burrs may also form at the cinch points. Such burrs create additional cutting concerns and may actually break free so that sharp metal debris is formed.

In order to cut a wire portion at locations such as those illustrated at 34 and 36 in FIG. 2, the wire cutter must be placed perpendicular to wire portion 40 and adjacent to transverse wire members 64 and 66,respectively. Such precise placement takes additional time and leaves significant margin for error.

Accordingly, it is an object of the present invention to provide a wire cutting tool that cuts wires so that smooth flat surfaces are left on the cut wire ends.

It is another object of the present invention to provide a wire cutting tool that may be easily positioned to cut the wire members of wire mesh components.

SUMMARY OF THE INVENTION

The present invention is directed to a hookbill wire cutter for cutting the wire members of wire mesh components such as cable support trays. The hookbill wire cutter features a pair of opposing handles. An alternative actuating mechanism may be substituted for the handles. The wire cutter also features a pair of jaws that are pivotally connected to the handles and each other. Each jaw has an arcuate blade. Each arcuate blade includes a flat cutting portion and a tapered portion positioned adjacent to the flat cutting portion. The flat cutting portions of the arcuate blades are positioned so that they engage in a scissor-like fashion when the jaws are closed. One arcuate blade has a tip with a notch formed therein. The notch is sized to engage a wire that is generally perpendicular to the wire that is being cut. This allows the wire cutter to be quickly and easily placed in the proper cutting position.

The arcuate blades are dimensioned to substantially surround the wire member being cut when the jaws are closing. The wire member is thus sheared flush when the jaws are closed. As a result, the cut wire ends are generally flat and smooth with no cinch points or burrs present.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 5:
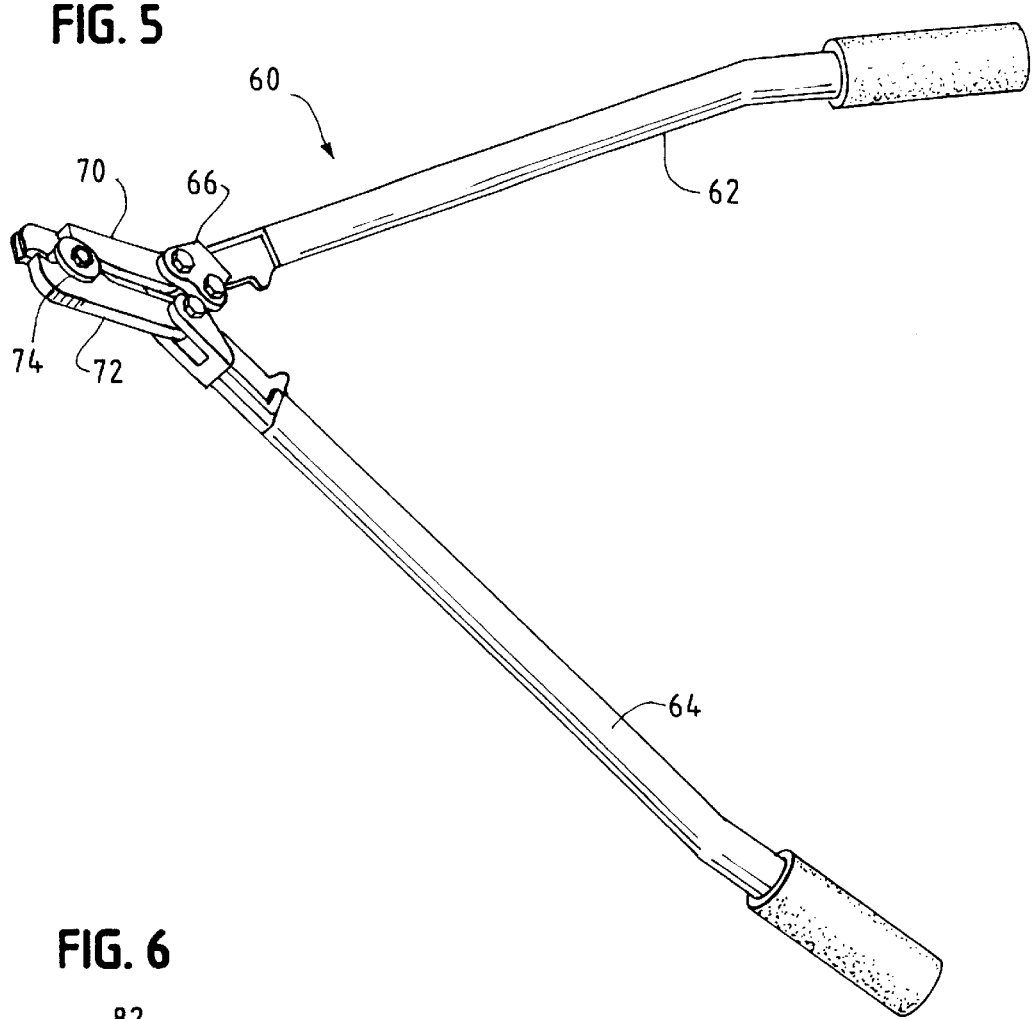
FIG. 5 is a perspective view of an embodiment of the hookbill wire cutter of the present invention.

With reference to FIG. 5, an embodiment of the hookbill wire cutter of the present invention is indicated generally at 60. The hookbill wire cutter 60 features an actuating mechanism in the form of a pair of opposing handles 62 and 64 joined by a linkage 66. The handle and linkage arrangement is of the type commonly employed by bolt cutters and thus is well known in the art. As an alternative to handles 62 and 64 and linkage 66, a pneumatic, electrical or hydraulic automatic actuating mechanism may be employed. An upper jaw 70 and lower jaw 72 are joined by pivot point 74 and are also joined to the linkage 66 so that when the opposing handles 62 and 64 are moved towards one another, the upper and lower jaws 70 and 72 are closed. The components of the hookbill wire cutter 60 are constructed of steel or similar materials known in the tool-making art. The upper and lower jaws 70 and 72 may optionally feature a laminated construction, as illustrated in FIG. 6.

Figure 1:
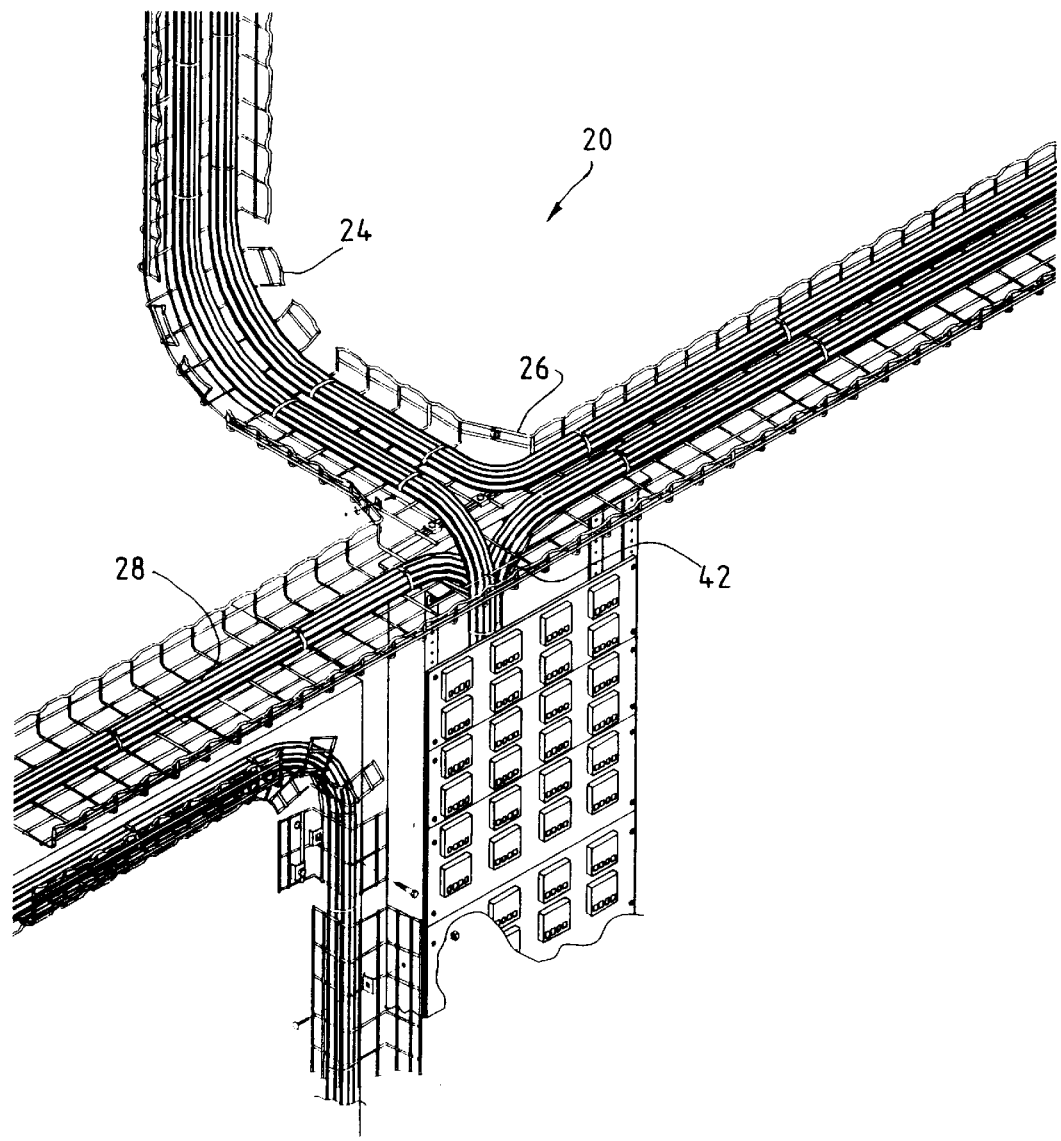
FIG. 1 is a partial perspective view of a prior art cable support tray system.
Figure 2:
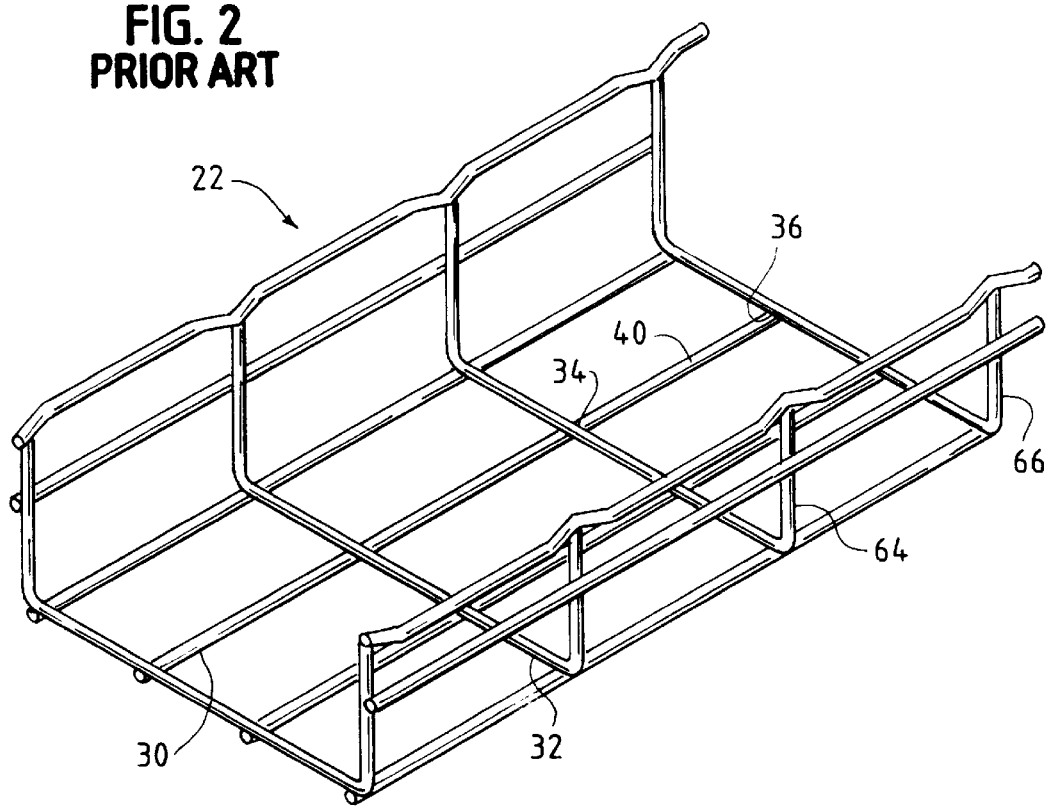
FIG. 2 is a perspective view of a tray section of the system of FIG. 1.
Figure 6:
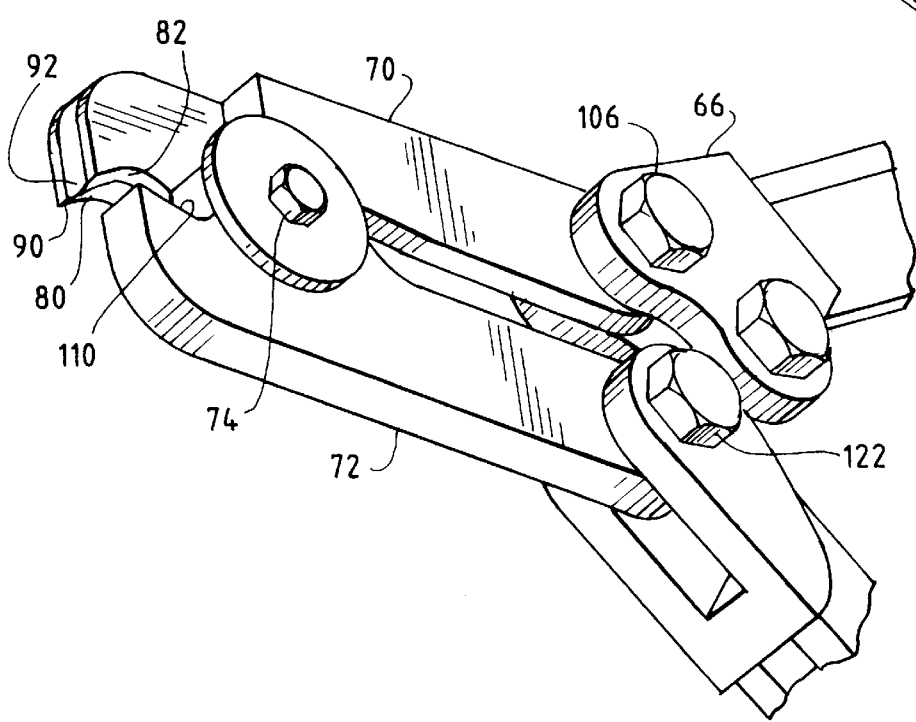
FIG. 6 is an enlarged perspective view of the jaws of the hookbill wire cutter of FIG. 5.
Figure 7:
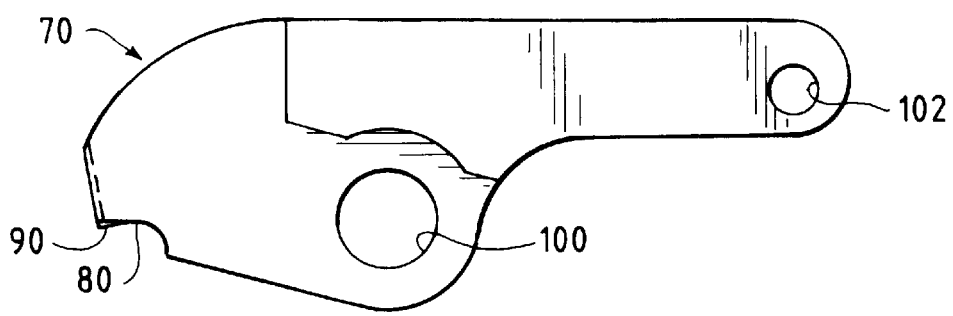
FIG. 7 is a side elevation view of the upper jaw of FIG. 6.
Figure 8:
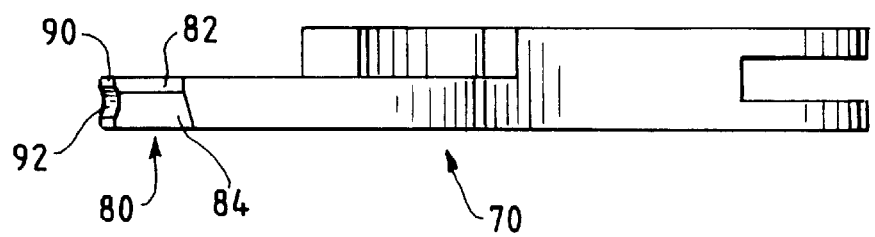
FIG. 8 is a bottom plan view of the upper jaw of FIG. 7.
Figure 11:
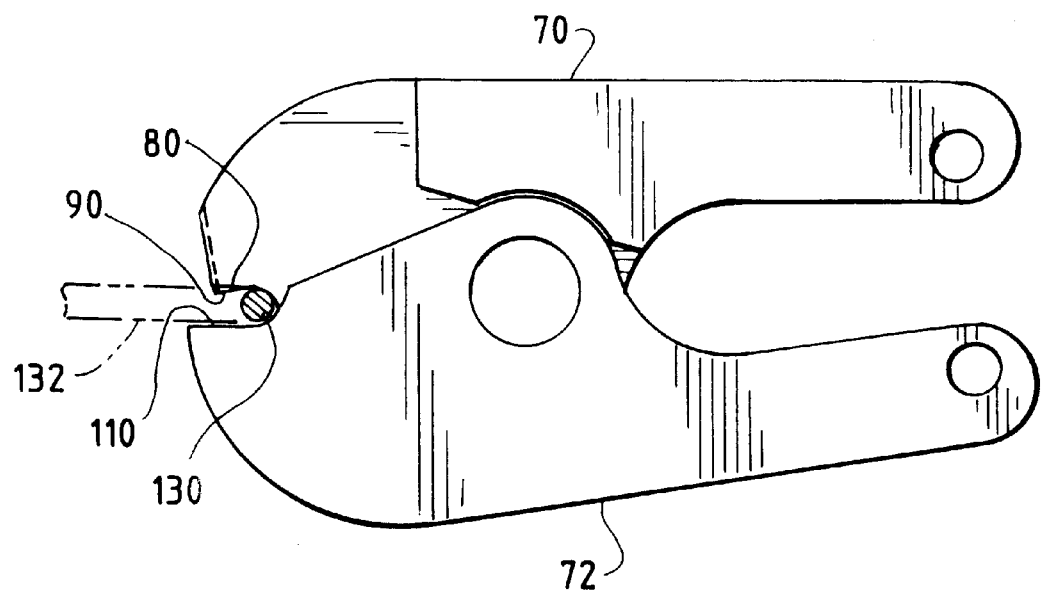
FIG. 11 is a side elevation view of the jaws of the hookbill wire cutter of FIG. 5 cutting a wire

As illustrated in FIGS. 6 and 7, the upper jaw 70 features an arcuate upper blade 80. Referring to FIG. 8 the blade 80 features a flat cutting portion 82 and a tapered portion 84 that tapers away from the flat cutting portion. Cutting blade 80 also features a tip 90 with a notch 92. Notch 92 is sized to engage a wire member that is perpendicular to the wire member that is being cut so that the wire cutter may be quickly and accurately positioned. For example, referring to FIG. 2, the hookbill wire cutter may be quickly and easily aligned to make a cut through wire member 30 at location 36 by placing notch 92 in engagement with transverse wire member 66. The proper positioning of the wire cutter via the notched tip 90 will also be discussed below with respect to FIG. 11 and perpendicular wire members 130 and 132.

Upper jaw 70 also features apertures 100 and 102. As will be described in more detail below, aperture 100 allows the upper jaw to be pivotally joined with the lower jaw (via aperture 104 in FIG. 9) by bolt 74 (FIG. 6). Aperture 102 allows the upper jaw to be pivotally joined to the linkage 66 by bolt 106, as illustrated in FIG. 6. As is known in the tool-making art, alternative fasteners such as rivets may be substituted for the bolts 74 and 106.

Figure 10:
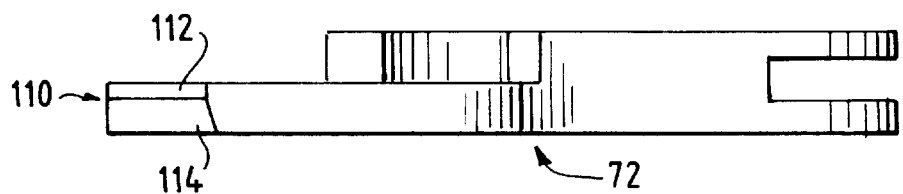
FIG. 10 is a top plan view of the lower jaw of FIG. 9.
Figure 9:
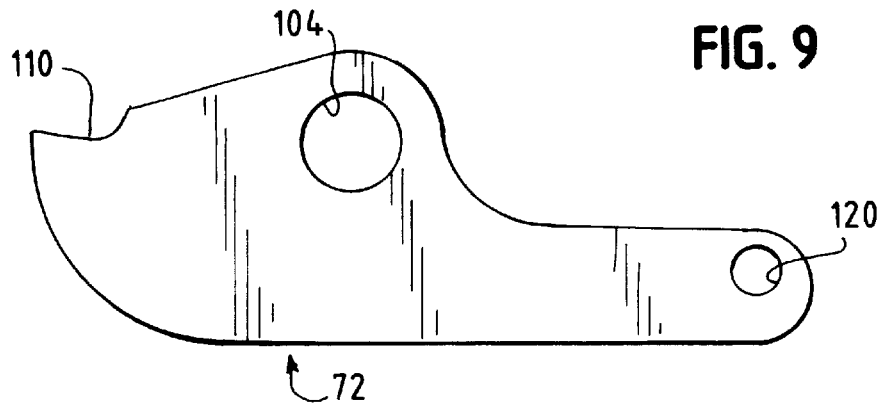
FIG. 9 is a side elevation view of the lower jaw of FIG. 6.

Lower jaw 72, as shown in FIGS. 6 and 9, also features an arcuate lower blade 110. As illustrated in FIG. 10, the blade 110 features a flat cutting portion 112 and a tapered portion 114 that tapers away from the flat cutting portion 112. As indicated at 120 in FIG. 9, the lower jaw also features an aperture so that is may be pivotally joined to linkage 66 via bolt 122 (as shown in FIG. 6).

As best illustrated in FIG. 6, upper and lower jaws 70 and 72 are pivotally joined by bolt 74 so that the upper and lower blades 80 and 110 overlap in a scissor-like fashion when the jaws are closed via the actuation of handles 62 and 64 in FIG. 5. More specifically, the flat cutting portions indicated at 82 and 112 in FIGS. 8 and 10, respectively, engage in a shearing fashion. As a result, referring to FIG. 11, a wire member 130 positioned within the blades 80 and 110 is substantially surrounded and cut or sheared from almost all sides. In other words, the arcuate shapes of upper and lower blades 80 and 110 provide a circular cut or shear about the wire member 130. As explained above, the wire cutter jaws are properly positioned about wire member 130 by engaging a perpendicular wire member, indicated in phantom at 132, with the notched tip 90 of the upper blade 80.

Figure 3:
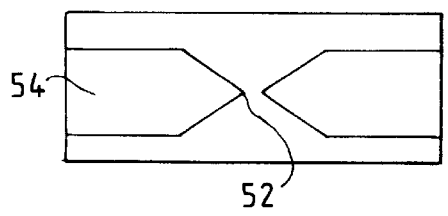
FIG. 3 is a side elevation view of a portion of a wire member that has been cut by a prior art straight blade wire cutter.
Figure 4:
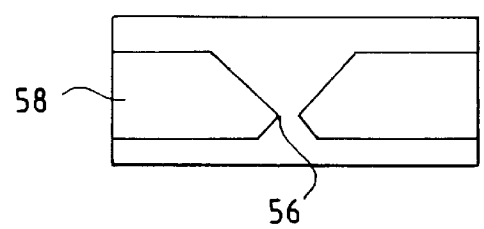
FIG. 4 is a side elevation view of a portion of a wire member that has been cut by a prior art offset blade wire cutter.
Figure 12:
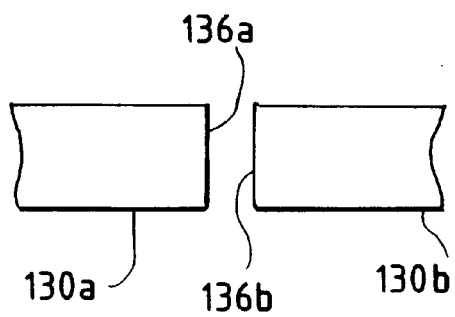
FIG. 12 is a side elevation view of a portion of a wire member that has been cut by the hookbill wire cutter of the present invention.

As a result of being cut from nearly all sides, wire member 130 is sheared flush, that is, cut square, so that generally smooth and flat wire surfaces, indicated at 136a and 136b in FIG. 12, are left on the cut ends of wire portions 130a and 130b. The cinch points illustrated at 52 and 56 of FIGS. 3 and 4, respectively, are eliminated so as to reduce the risk of burrs and cuts in cables or other objects.

It should be noted that the hookbill wire cutter of the present invention may be used to cut the wire members of wire mesh components other than cable support trays. Such wire mesh components may include, for example, wire baskets or fencing. It should also be noted that while the terms "upper" and "lower" were used in the above description, the hookbill wire cutter of the present invention may be used in a variety of orientations so that its components may not necessarily be above or below one another.

While the preferred embodiments of the invention have been shown and described, it will be apparent to those skilled in the art that changes and modifications may be made therein without departing from the spirit of the invention, the scope of which is defined by the appended claims.

What is claimed is:

1. A hookbill cutter for cutting a first wire member of a wire mesh component, where the wire mesh component is constructed of the first wire member and a second wire member fastened generally perpendicular to the first wire member, the hookbill cutter comprising:

a) a pair of opposing handles;

b) a first jaw having a first arcuate blade, said arcuate blade having a tip with a notch formed therein, said notch adapted to engage the second wire member of the wire mesh component;

c) a second jaw having a second arcuate blade;

d) said first and second jaws joined to the pair of opposing handles and pivotally joined together so that said first and second jaws open and close in an overlapping fashion when said pair of opposing handles are actuated; and e) said first and second arcuate blades dimensioned to substantially surround the first wire member when the notch in the tip of the first blade is in engagement with the second wire member and the first and second jaws are closing so that the first wire member is sheared flush when said first and second jaws are closed to avoid formation of cinch points and burrs.

2. The hookbill cutter of claim 4 wherein said first and second arcuate blades each includes a flat cutting portion and a tapered portion positioned adjacent to the flat cutting portion, said flat cutting portions of the first and second arcuate blades positioned so that they engage in a scissor-like fashion when the first and second jaws are closed.

3. The hookbill cutter of claim 1 further comprising a linkage connected between the first and second jaws and the pair of opposing handles.

4. A hookbill cutter for cutting a wire member comprising:

a) a pair of opposing handles;

b) a first jaw having a first arcuate blade, said first arcuate blade having a positioner formed therein, said positioner adapted to engage said wire member;

c) a second jaw having a second arcuate blade;

d) said first and second jaws joined to the pair of opposing handles and pivotally joined together and said first and second arcuate blades shaped so that they open and close in an overlapping fashion when said pair of opposing handles are actuated; and e) said first and second arcuate blades dimensioned to substantially surround the wire member when the first and second jaws are closing so that the wire member is sheared flush when said first and second jaws are closed to avoid formation of cinch points and burrs.

5. The hookbill cutter of claim 1 wherein said first and second arcuate blades each includes a flat cutting portion and a tapered portion postponed adjacent to the flat cutting portion, said flat cutting portions of the first and second arcuate blades positioned so that they engage in a scissor-like fashion when the first and second jaws are closed.

6. The hookbill cutter of claim 1 further comprising a linkage connected between the first and second jaws and the pair of opposing handles.

7. The hook bill cutter of claim 1 wherein the positioner includes a tip with a notch formed therein, said notch adapted to engage said wire member.

8. The hook bill cutter of claim 1 wherein said first arcuate blade has a length greater than the length of said second arcuate blade.

9. A hookbill jaw set for attachment to an actuating mechanism, said hookbill jaw set suitable for cutting a first wire member of a wire mesh component constructed of the first wire member and a second wire member fastened generally perpendicular to the first wire member, the hookbill jaw set comprising:
   a) a first jaw having a first arcuate blade, said arcuate blade having a tip with a notch formed therein, said notch adapted to engage the second wire member of the wire mesh component;
   b) a second jaw having a second arcuate blade;
   c) said first and second jaws adapted to be joined to the actuating mechanism and pivotally joined together so that said first and second jaws open and close in an overlapping fashion when the actuating mechanism is activated; and
   d) said first and second arcuate blades dimensioned to substantially surround the first wire member when the notch in the tip of the first blade is in engagement with the second wire member and the first and second jaws are closing so that the first wire member is sheared flush when said first and second jaws are closed to avoid formation of cinch points and burrs.

10. The hookbill jaw set of claim 9 wherein said first and second arcuate blades each includes a flat cutting portion and a tapered portion positioned adjacent to the flat cutting portion, said flat cutting portions of the first and second arcuate blades positioned so that they engage in a scissor-like fashion when the first and second jaws are closed.

* * * * *